(12) United States Patent
Farag

(10) Patent No.: US 9,056,272 B2
(45) Date of Patent: Jun. 16, 2015

(54) ISOTOPES SEPARATION AND PURIFICATION IN AN ELECTROLYTIC MEDIUM

(76) Inventor: Tarek A. Z. Farag, St. Charles, IL (US)

( * ) Notice: Subject to any disclaimer, the term of this patent is extended or adjusted under 35 U.S.C. 154(b) by 2874 days.

(21) Appl. No.: 11/307,947

(22) Filed: Feb. 28, 2006

(65) Prior Publication Data

US 2007/0199830 A1    Aug. 30, 2007

(51) Int. Cl.
| | | |
|---|---|---|
| B01D 59/38 | (2006.01) | |
| B01D 59/42 | (2006.01) | |
| B01D 53/22 | (2006.01) | |
| B01D 53/24 | (2006.01) | |
| B01D 53/32 | (2006.01) | |
| B01D 61/44 | (2006.01) | |

(52) U.S. Cl.
CPC .............. *B01D 59/42* (2013.01); *B01D 53/226* (2013.01); *B01D 53/229* (2013.01); *B01D 53/24* (2013.01); *B01D 53/326* (2013.01); *B01D 61/44* (2013.01); *B01D 2259/814* (2013.01); *B01D 2311/2603* (2013.01); *B01D 2311/2676* (2013.01)

(58) Field of Classification Search
USPC ................................................. 205/687, 688
See application file for complete search history.

(56) References Cited

U.S. PATENT DOCUMENTS

| | | | |
|---|---|---|---|
| 1,422,121 A | | 7/1922 | Millen |
| 2,873,237 A | * | 2/1959 | De Lacheisserie et al. ... 205/558 |
| 3,722,677 A | | 3/1973 | Lehnert |
| 3,891,413 A | | 6/1975 | Sievers et al. |
| 3,907,521 A | | 9/1975 | McConnell |
| 4,225,402 A | | 9/1980 | LeRoy et al. |
| 4,567,025 A | | 1/1986 | Peterson |
| 5,024,749 A | | 6/1991 | Snyder et al. |
| 5,130,001 A | | 7/1992 | Snyder et al. |
| 5,183,542 A | * | 2/1993 | Jackovitz et al. .............. 204/451 |
| 5,183,548 A | * | 2/1993 | Snyder et al. ................. 204/645 |
| 5,437,795 A | | 8/1995 | Snyder et al. |
| 5,595,666 A | | 1/1997 | Kochen |
| 5,939,029 A | | 8/1999 | Ohkawa |
| 5,948,214 A | | 9/1999 | Bailey |
| 6,110,373 A | | 8/2000 | Patterson et al. |
| 6,267,850 B1 | | 7/2001 | Bailey et al. |
| 6,277,265 B1 | * | 8/2001 | Hanak ........................... 205/687 |

(Continued)

OTHER PUBLICATIONS

Ohmori et al., Positive and negative energy evolution and new element production in critical electrolysis with Palladium electrode in K2Co3/H2O solution, no date, catalysis REsearch Center, Hokkaido University pp. 22-26.*

(Continued)

*Primary Examiner* — Arun S Phasge

(57) ABSTRACT

A system and method for continuously separating different isotopes of a particular element, such as Uranium, Zirconium, or Hydrogen, in an electrolytic medium. The ions of the isotopes to be separated are moved in the electrolytic medium using electric field. As the lighter ions will move faster than the heavier ions, the separation will happen and the lighter ions will be ahead of the heavier ions by a separation distance. To improve the separation, other forces (either proportional to the mass or not) are generated on the ions in directions that add additional separation factors. These forces could be centrifugal, electromagnetic, resistive dragging, mechanical (flow), etc. The invented separation process and device is simple and less expensive than other comparable devices, providing outstanding separation at low cost, and could be built using the already available materials and technologies that exist in any country in the world.

20 Claims, 1 Drawing Sheet

(56) References Cited

U.S. PATENT DOCUMENTS

| | | |
|---|---|---|
| 6,322,706 B1 | 11/2001 | Ohkawa |
| 6,323,455 B1 | 11/2001 | Bailey et al. |
| 6,348,153 B1 | 2/2002 | Patterson et al. |
| 6,726,844 B2 | 4/2004 | Ohkawa et al. |
| 2005/0121337 A1* | 6/2005 | Van Den Winkel ........... 205/704 |
| 2005/0232861 A1 | 10/2005 | Buchanan et al. |

OTHER PUBLICATIONS

Aisen et al. Study of isotope separation of some chemical elements in a gas centrifuge, (1996), Nuclear Instruments and Methods in Physics Research A 374. pp. 127-131.*

* cited by examiner

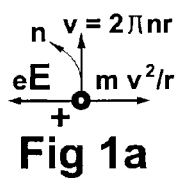
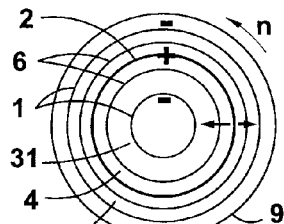
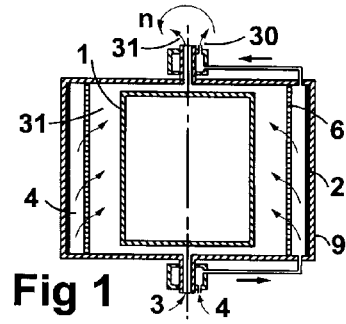
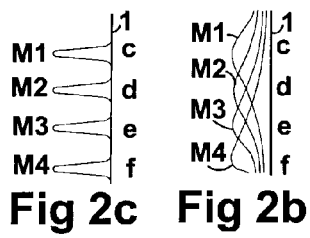
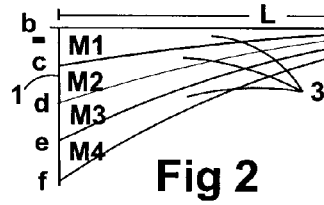
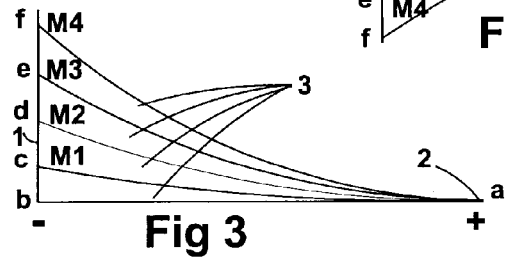
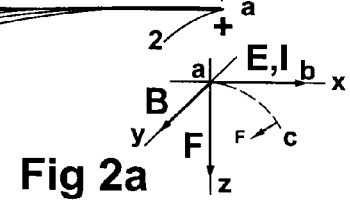
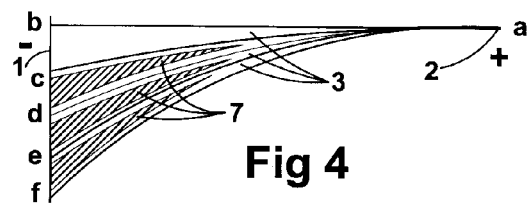
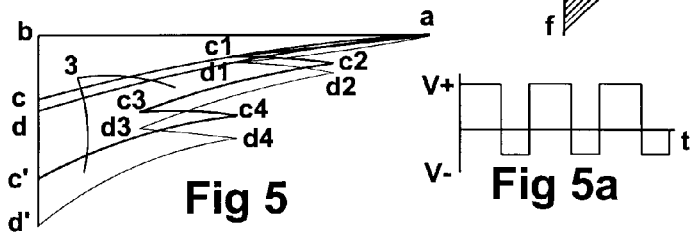
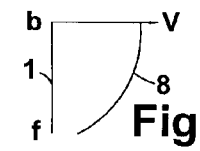
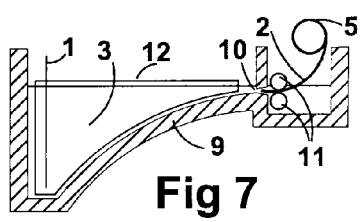
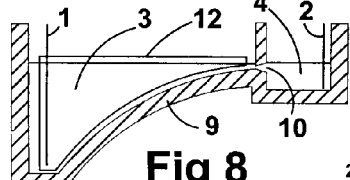
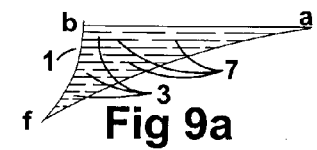
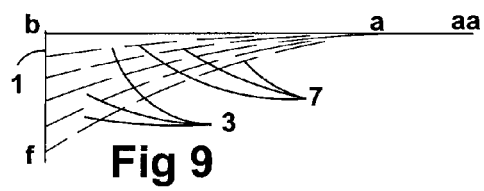
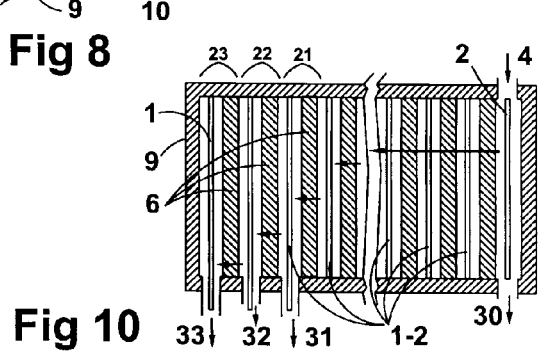

ISOTOPES SEPARATION AND PURIFICATION IN AN ELECTROLYTIC MEDIUM

BACKGROUND OF THE INVENTION

1. Field of Invention

This invention relates to a method and an apparatus for the separation and purification of isotopes in an electrolytic medium using electrochemical methods alone or combined with other separation methods like centrifugal, electromagnetic, eddy currents, membrane diffusion, etc. It is related to the enrichment of U235 to get any enrichment required to build nuclear weapons or fuel for power nuclear reactors. Also, it is related to the separation of isotopes for medical and industrial applications.

2. Prior Art

Isotope separation was done for many years with different methods. One of the used methods was electromagnetic separation by applying electric and magnetic fields in vacuum. This method was modified to perform the separation in a plasma (U.S. Pat. No. 6,726,884). Gaseous separation of Uranium isotopes was performed on a large scale using special expensive diffusion membranes. Many U.S. patents for chromatographic separation were issued, which require high pressure and consume large amounts of energy. One of the widely used methods is the centrifugal separation. This method requires special expensive centrifugal units and has low yield, and must rotate at extremely high speeds. The prior art methods have many disadvantages, some of these are: require large costly equipment, have high energy requirements, need special costly materials with very limited availability, have low yield and low separation factors, operate at high pressure or at high vacuum, and are complicated and difficult to operate.

3. Objects and Advantages

Accordingly, several objects and advantages of my invention are:

(a) to provide a simple and inexpensive method and device to separate different isotopes of elements efficiently;
(b) to provide a method and device to separate different isotopes which will have the advantages as mentioned in (a), and could be constructed from readily available materials and use readily available technologies;
(c) to provide a method and device to separate different isotopes which will have the advantages as mentioned in (a) or (b), and require low energy consumption;
(d) to provide a method and device to separate different isotopes which will have the advantages as mentioned in any or all of (a) to (c), and does not require high pressure or high vacuum;
(e) to provide a method and device to separate different isotopes which will have the advantages as mentioned in any or all of (a) to (d), and does not require high strength mechanical structures to support excessive stresses, due to high speeds of rotation, high pressure, or vacuum;
(f) to provide a method and device to separate different isotopes which will have the advantages as mentioned in any or all of (a) to (e), and could have separation capabilities in more than one direction;
(g) to provide a method and device to separate different isotopes which will have the advantages as mentioned in any or all of (a) to (f), and could purify the separated isotopes from impurities;

Further objects and advantages are to provide a method and device to separate more than one isotope in the same apparatus at the same time. Still further objects and advantages will become apparent from a consideration of the ensuing description and drawings.

SUMMARY

The present invention is a method and device to separate different isotopes in an electrolytic medium (like aqueous solution). The ions of the isotopes to be separated are moved in the medium using electric field. As the lighter ions will move faster than the heavier ions, the separation will happen and the lighter ions will be ahead of the heavier ions by a separation distance. To improve the separation, other forces (either proportional to the mass or not) are generated on the ions in directions that add additional separation factors. These forces could be: centrifugal, electromagnetic, membranes or porous materials resistance, resistive viscous dragging, mechanical (flow), etc. The resulting separation device is less expensive than other comparable devices, providing outstanding separation at low cost. This invented device could be built using the already available materials and technologies that exist in any country in the world.

DRAWINGS—FIGURES

FIG. 1 shows a vertical cross sectional view of a simplified device for isotope separation by centrifugal force.

FIG. 1a shows the centrifugal force and the electric field force acting on an ion.

FIG. 1b shows a horizontal cross sectional view for isotope separation by centrifugal force.

FIG. 2 shows the separate paths of ions in electrical and magnetic fields.

FIG. 2a shows the interaction of magnetic field and electric current to generate force.

FIG. 2b shows different isotopes distribution for ionized isotopes in electrochemical system.

FIG. 2c shows different isotopes distribution for ionized isotopes in vacuum systems.

FIG. 3 shows similar graph to FIG. 2 with the force acting upward.

FIG. 4 shows the addition of separators to enhance the separation of different isotopes.

FIG. 5 shows that reversing the electric field and magnetic field can improve the separation.

FIG. 5a shows one form of reversed electric field by voltage reversal.

FIG. 6 shows a variable voltage gradient applied to the cathode to reduce the tendency of the ions to move directly from point "a" to point "f".

FIG. 7 shows an electrochemical separation apparatus with the feed of isotopes is in the form of a continuous thin sheet (5).

FIG. 8 shows an electrochemical separation apparatus with the feed of isotopes in the form of a continuous electrolyte (4) fed through a narrow slit.

FIG. 9 shows another method for the addition of separators to enhance the separation of different isotopes.

FIG. 9a shows a mechanical construction for the cathode with the addition of separators to enhance the separation of different isotopes.

FIG. 10 shows an electrochemical separation apparatus using separation membrane.

(NOTE: ALL THE DRAWING FIGURES ARE NOT TO SCALE).

REFERENCE NUMERALS

1   Electrode (cathode)
2   Electrode (anode)
3   Normal electrolytic solution
4   Feed (electrolyte)
5   Feed (thin sheet)
6   Membrane or porous material
7   Separators
8   Voltage gradient
9   Electrolytic tank
10  Feeding slit
11  Feed rollers
12  Permanent magnet
21  Separation cell (M1)
22  Separation cell (M2)
23  Separation cell (M3)
30  Electrolytic solution containing low concentration of certain isotope
31  Electrolytic solution containing high concentration of isotope 1
32  Electrolytic solution containing high concentration of isotope 2
33  Electrolytic solution containing high concentration of isotope 3

DRAWINGS REFERENCE LETTERS, ABBREVIATIONS, AND SYMBOLS

I Electrical current.
E Electric field.
B Magnetic field.
e Charge of an electron.
a Starting point of the ions.
aa Pre-starting point of ions to attain speed before reaching point (a).
b End point of the ions at the electrode 1 without the presence of a magnetic field.
c End point of the heaviest ions at the electrode 1 with the presence of a magnetic field.
c' End point of the heaviest ions with the presence of a reversing magnetic and electrical fields.
d End point of the ions lighter than the heaviest with the presence of a magnetic field.
d' End point of the ions lighter than the heaviest with the presence of a reversing magnetic and electrical fields.
e End point of the ions lighter than that of "d" with the presence of a magnetic field.
f End point of the lightest ions with the presence of a magnetic field.
* multiplication symbol.
^ exponent symbol [for example: t^2 means t raised to the power 2, i.e. (t*t)]
m mass
M1 mass of the heaviest isotope.
M2 mass of the second heaviest isotope (M1>M2)
M3 mass of the third heaviest isotope (M1>M2>M3)
F force
Fb Magnetic force
L travel distance of the ions from the negative electrode (2) to the positive electrode (1) (e.g. the distance a-b in FIG. 2)
n speed of rotation (revolutions per sec)
N number of separation cells
pi the ratio of the circumference to the diameter of a circle ($\pi$), approximately 3.14159
r radius of a circle
t time
v velocity
Symbol like U238 is an abbreviation for the Uranium isotope that has a mass number of 238.
Similarly, U235 is an abbreviation for the Uranium isotope that has a mass number of 235.

DETAILED DESCRIPTION

In an electrochemical setup, similar to the setups used for electroplating, electrorefining, etc., a voltage difference is applied between two electrodes to generate electric field that generates ions with positive and negative charges. The negative charges will move towards the positive electrode (anode), while the positive charges will move towards the negative electrode (cathode). The electric charge on ions of different isotopes is the same, but the mass is different. When these ions are present in an electrical field, this field will generate equal electrical forces that move the positive ions to the negative electrode in the direction of the field. Since the masses of different isotopes are not the same, each isotope will accelerate according to its mass. Lighter isotopes will move faster and become separated from heavier isotopes that move slower. Adding another magnetic force perpendicular to the electric force will deviate the ions from their original path. The magnetic force will act on the ions and accelerate them according to the mass of each. At the time the ions reach the negative electrode they will be also separated in the direction of the magnetic force. With these two forces, electric and magnetic, the isotopes will be separated in two directions. Another method to add separation to the isotopes is to have a centrifugal force act on the ions. The centrifugal force has the feature that it is proportional to the mass of the ion. By making the centrifugal force just enough to move the heavier isotope away from the negative electrode, the lighter isotope will be able to move alone to the negative electrode achieving substantial separation. To improve the separation of isotopes membranes or porous materials could be added. They could be made from inert materials, but is preferably formed from a material which is capable of enhancing the isotopic separation process through either chromatographic or ion exchange forces. Appropriate selection of the force components and the parameters of the processes could achieve excellent separation. Most of the following description will be given for separating isotopes that have positive ions in the separation electrolyte like U235 and U238, and will be collected at electrode (1). Hence, electrode (1) needs to be negative to attract these positive ions. The same discussion applies to separating isotopes that have negative ions in the separation electrolyte. In this case we need to reverse the polarity of the collecting electrode (1) to keep the same reference numbers on the drawings. Also, the direction (polarity) of the magnetic field should be considered to keep the required performance.

Isotope Separation Using Centrifugal Forces

In an electrochemical-centrifugal separation setup as shown in FIG. 1a, an ion (charged particle with charge e) under the effect of two forces: an electrical force (e*E) and a centrifugal force (m*v^2/r). Where r is the radius of rotation, and n is the speed of rotation of the ion (rev./sec.), which is the same speed of the rotation of the apparatus. The value of the velocity v, and the radius of the circle of revolution (r), can be represented by the equation:

$$v=2*(pi)*n*r \qquad (1)$$

In the cases where the electrical force is opposite to the centrifugal force (as in FIG. 1a), the net force F1 acting on an ion of mass M1, at radius r, will be:

$$F1=(e*E)-[(M1*v^2)/r] \qquad (2)$$

Similarly, the net force F2 acting on an ion of mass M2, at radius r, will be:

$$F2=(e*E)-[(M2*v^2)/r] \qquad (3)$$

Since it is easy to control the electric field (E) with high precision, we can choose the parameters of the separation apparatus (E, r, n), such that the net force F1 on the heavier isotope M1 to be slightly negative or zero. This choice will prevent the heavier isotope M1 from moving towards the central electrode, while the lighter isotope M2 will be able to move to the central electrode, resulting in a high efficient separation.

An important relationship could be concluded from eqn (1) and eqn (2) when F1=0, $$E = K*M1*r*n^2 \qquad (4)$$

Where K is a constant, $$K = 4*[(pi)^2]/e = 39.48/e \qquad (5)$$

A very important feature of this invention is revealed from eqn (4). It indicates that LOW SPEEDS OF ROTATION (n), COULD BE CHOSEN TO ACHIEVE HIGHLY EFFICIENT SEPARATION, COMPARED TO EXTREMELY HIGH SPEEDS OF ROTATION REQUIRED TO ACHIEVE LOW SEPARATION FACTORS IN THE PRIOR ART CENTRIFUGAL SEPARATION (like separating U235 from U238).

Substituting into eqn (3), we get:

$$F2 = 39.48*(M1-M2)*r*n^2 \qquad (6)$$

Equation (6) indicates that the separation force F2 is proportional to the mass difference (M1−M2) (not the ratio M1:M2), the radius (r), and the square of the rotation speed (n). The parameter (M1−M2) of eqn (6), represents the separation dependency on the masses. In the case of U238 with U235 the numerical value of the parameter will be (3), while in the case of Hydrogen H1 with Deuterium D2 it will be (1). It should be noted that part of the electric field would be required to ionize the molecules of the isotopes. It is desirable to run the separation process at the maximum practical speed of rotation (n).

The above method of separation is demonstrated in a simple setup shown in FIG. 1 and FIG. 1b. They show a negative electrode (1) and a positive electrode (2), at a suitable voltage difference (V), with a suitable electrolytic solution (3) between them. The whole setup is enclosed in a tank (9). A membrane (6) is added to improve the separation. It help keep the two electrolytes on both sides of the membrane separated, and adds a small resistance to further impede the motion of the heavier isotope. Although it is desirable that this membrane (6), could be of selective characteristics for different isotopes, it is not absolutely necessary, as in the case of other separation methods, like diffusion and chromatographic separation. The demands on this membrane (6) are minimal, the cost will be low, and the availability will be high. It is possible to build the unit as a multi-stage separation, by using multiple concentric membranes and electrodes in a way similar to FIG. 10. The whole setups of FIG. 1 and FIG. 1b are rotating around the central axis at the rotational speed (n). Although FIG. 1 shows a cylindrical tank, it is possible to make the apparatus in a spherical shape, which can improve the mechanical strength.

One method to use the setup of FIG. 1 for separation of isotopes, is to make the electrode (2) from the isotope mixture to be separated (like pure natural Uranium). And collect the lighter isotope (like U235 only) on the other electrode (1), in a process similar to electroplating. Or continuously collect the lighter isotope (like U235 only) as an electrolyte rich in this isotope, and later process it to extract this isotope.

Another method to use the setup of FIG. 1 for separation of isotopes in a continuous process, is to feed an electrolyte (4) containing the ions of the isotope mixture to be separated (like pure natural Uranium) at the electrode (2). The lighter isotope (U235) will be removed from this electrolyte (4) and becomes electrolyte (30), which could be removed from the apparatus. The electrolyte at the electrode (1) will be rich in the lighter isotope (U235). The process could be designed to collect the lighter isotope on the electrode (1) as a pure isotope, in a process similar to electroplating. Or enrich the electrolyte surrounding the electrode (1) with this isotope (U235) to become electrolyte (31). Then this electrolyte (31) could be removed for other processing to extract the required isotope (U235). When using this centrifugal separation to separate many isotopes: M1, M2, M3, and M4, of the same element (like Zirconium), the lightest isotope M4, could be separated first, then M3, then M2, and finally M1. Also, a multi-stage centrifugal apparatus, as mentioned before, could be used to separate all the isotopes on the same time in the same apparatus. Notice that FIG. 1b shows another membrane (6) (or porous membrane) and a negative electrode (1) (at a voltage just enough to overcome the membrane voltage drop) added at a radius larger than the radius of the positive electrode (in the opposite direction of the central negative electrode). These two components (membrane and electrode) will move the heavy ions in the opposite direction of the light ions, reducing the concentration of the heavy isotopes. This will help improve the separation since it will reduce the screening of the heavier ions to the lighter ions, and reduce their probability to move to the central electrode where the lighter ions are collected.

Isotope Separation Using Electromagnetic Fields

FIG. 2a shows an ion (charged particle) moving under the effect of an electrical field in the direction (ax). If we apply a magnetic field in a direction (ay), perpendicular to (ax), a force F in the direction (az) will affect the passage of this charged particle and force it to deviate away from the straight-line (ab) to the curved trajectory (ac). In an electrochemical setup, similar to the setups used for electroplating, electrorefining, etc. a voltage difference is applied between two electrodes to generate electric field that generates ions with positive and negative charges. The negative charges will move towards the positive electrode (anode), while the positive charges will move towards the negative electrode (cathode). The electric charge on ions of different isotopes is the same, but the mass is different. In the presence of a magnetic field (as in FIG. 2a), the perpendicular force F will accelerate the ions in the direction of the force. As the mass of each isotope is different, each isotope will move in a different trajectory, separate from others. The trajectory deviation of each isotope will be proportional to its mass. When the ions reach the other electrode, isotopes with the same mass will accumulate at the same spot, and will be separated from other isotopes.

Assuming constant magnetic field and constant resistances, the force (Fb) will be constant, and the distance (z1) that the ion of mass (M1) will reach after time (t), will have the form:

$$z1 = 0.5*Fb*t^2/M1 \qquad (7)$$

(By integrating twice the equation Fb=M1*acceleration) Similarly:

$$z2 = 0.5*Fb*t^2/M2 \qquad (8)$$

Subtracting eqn (7) from eqn (8), we get the separation distance (z2−z1) in the direction of the z-axis, between the two isotopes (M2) and (M1) after traveling for time (t), under the magnetic force (Fb), as:

$$z2 - z1 = 0.5*(Fb*t^2)*[(1/M2) - (1/M1)] \qquad (9)$$

Where (t) is the travel time between the two electrodes (on the x-axis), z2, z1 are the deviation distances (on the z-axis) of the masses M2, M1 respectively. It should be noted that the dragging force on the ions, which is dependent on the size of the ion (i.e. its mass), was ignored. This dragging force should have large effect on the separation, especially when the ions pass through the membranes.

The same theory of separation is demonstrated in FIG. 2. FIG. 2 shows a negative electrode (1) and a positive electrode (2), at a suitable voltage difference (V), with a suitable electrolytic solution (3) between them, and a magnetic field applied perpendicular to the electric field (perpendicular to the paper surface) (not shown). This magnetic field could be generated using suitable coils, especially in the cases where a reversal of the magnetic field is required. In the cases where a constant magnetic field is required, multiple permanent magnets formed as sheets could be used. Ceramic magnets are preferred in making the permanent magnets for their good resistance to chemicals and for their insulating characteristics.

Let us assume that we have a metal that has isotopes with atomic masses: M1, M2, M3, and M4, where M1>M2>M3>M4. And that the molecules of these isotopes will start from the positive electrode (2) at a point (a). The voltage difference between the two electrodes will generate an electric field that attracts the positive ions to the negative electrode (1). When the magnetic field is absent, most of the ions will move on the shortest path (a-b). With the presence of a magnetic field that generates a down forces on these ions, the lighter ions will respond quicker than the heavier ions and move down faster. By the time the ions reach the electrode (1) they will be separated as show in FIG. 2. The heaviest isotope M1 will reach the point (c) while the lightest isotope M4 will reach the point (f) below (c). Other isotopes will reach points in between (c) and (f) such that the deviation distances: (bc) of M1<(bd) of M2<(be) of M3<(bf) of M4. FIG. 2c shows the isotope distribution for an electromagnetic separation in vacuum, which has sharp peaks of isotope concentration and relatively wide separation areas. FIG. 2b shows the isotope distribution for an electromagnetic separation in an electrolyte, which has blunt peaks of isotope concentration without sharply defined separation areas.

The separation setup shown in FIG. 3, is similar to FIG. 2, except that the magnetic field is reversed generating an upward force instead of a downward force.

It was shown previously in eqn (9), that the separation distance is proportional to $(t^2)$. To achieve a larger separation distance, without increasing the distance between the two electrodes (travel distance), a reversal of both the electric and magnetic fields is suggested, as shown in FIG. 5. Assuming that the ions will start at point (a) on electrode (2), the heavier isotope M1 will follow the path (a-c1), the lighter isotope M2 will follow the path (a-d1). Then a reverse voltage and reverse magnetic field will be applied. The motion of the two isotopes will be reversed going back towards the electrode (2), following the paths (c1-c2) for (M1) and (d1-d2) for (M2). Now the separation distance (d2-c2) is larger than (d1-c1). Another field reversal will happen moving the isotopes towards the electrode (1), following the paths (c2-c3) for (M1) and (d2-d3) for (M2). The separation distance (d3-c3) is larger than (d2-c2). The field reversal processes will continue till the isotopes will finally reach the electrode (1) at the two points (c') for (M1) and (d') (for M2). The separation distance (d'-c') is larger than the non-reversal separation distance (d-c). It should be noted that the reversed voltage (V−) could be selected such that (V+)>(V−), and the reverse times (t+)>(t−), as shown in FIG. 5a. It is important to notice that the reversal of the electric field could be generated as a result of the reversal of the magnetic field, as an eddy-current effect, or using a microwave power generator.

The previous discussion demonstrates the basic theory and the process of separation using this theory under certain conditions that can achieve high separation factor (close to 100%), as shown in FIG. 2c. Considering the possible practical structure of such setups, the isotopes will not be clearly separated. They could have mixed distribution with peaks of each isotope at points close to the theoretical locations, as shown in FIG. 2b. Some factors will prevent the separation from happening at 100%. These factors comprise: collision of ions with other ionized and neutral molecules, secondary ionization, multiple ionization, the shape of the electric field is not parallel lines, and the straight paths: (a-b), (a-c), (a-d), etc. have resistances close to each other, which give all the ions of all isotopes the tendency to move directly from points like (a) to points like (f), (e), etc. irrespective of the presence of the magnetic field.

To improve the separation, many methods could be applied individually or combined together as discussed in the following.

1. IMPROVING THE SEPARATION FACTOR BY ADDING SEPARATORS: The main function of the separators (7), is to increase the effect of the magnetic field by isolating different isotopes and providing different passages for them. These separators could have different forms. The simplest form could be an insulating material to shape the electric field and the passage of ions, as shown in FIG. 7. The separators (7) shown in FIG. 9 and FIG. 9a, demonstrate a possible shape of this simple construction. They could be formed as sheets of insulating materials with openings that allow the deviated isotopes to pass through them. In the cases where there is a reversal of the electric and magnetic fields, as shown in FIG. 5, the openings in these sheets could be designed to match the reversal points c1, d1, c2, d2, etc. Another form of these separators (7) is to make them from POROUS MATERIALS OR DIFFUSION MEMBRANES. In this case the separation factor will improve greatly, since the larger molecules will have higher resistance going through such materials. Also, membranes could be designed to be selective for certain ions of certain isotopes. It should be noted also that the porous materials could be designed to trap or selectively trap certain molecules inside them.

2. IMPROVING THE SEPARATION FACTOR BY APPLYING A VOLTAGE GRADIENT ON THE ELECTRODE (1): A voltage gradient (8) like the one shown in FIG. 6, can reduce the tendency of the ions to take direct paths like (a-f), which will improve the separation factor. This is because the best separation factor is achieved when all the ions are moving in the direction (a-b), at the beginning of their trajectory, then get deviated by the magnetic field. Making the electrode from different segments, each insulted from the other, and connecting each segment to its corresponding voltage source could generate this voltage gradient. Also, making the electrode (1) from semi-resistive material, like porous graphite, could generate the required voltage gradient especially under high operating current.

3. IMPROVING THE SEPARATION FACTOR BY SHAPING THE ELECTRODE (1): A shaping in which direct paths like (a-f) are elongated, as shown in FIG. 9a, will increase the path resistance which will reduce the tendency of the ions to follow it. This will have an effect similar to generating voltage gradient on the electrode (1) as discussed before. This shaping will improve the separation factor since fewer ions will have the tendency to deviate from the path (a-b) without the magnetic field.

4. IMPROVING THE SEPARATION FACTOR BY ADDING A PRE-STARTING UNIDIRECTIONAL STAGE: The path (aa-a) shown in FIG. 9, is a narrow passage to confine the electric field in the direction of the straight line (aa-a-b). When ions start moving from electrode (2) to electrode (1), they will follow this line and gain speed in this direction only. Once they reach point (a), they will continue in this direction and start deviating by the magnetic field.

5. IMPROVING THE SEPARATION FACTOR BY ADDING ORGANIC ADDITIVES TO THE ELECTROLYTE: It is well known in aqueous electrolytic purification that adding special organic materials can help improve the purification process. The same technique could be used in improving the separation factor.

6. IMPROVING THE SEPARATION FACTOR BY ADDING ADDITIVES TO GENERATE RESISTANCE GRADIENT: In a setup like the one shown in FIG. 9a, horizontal layers of electrolytes with different resistances, could be sustained by using separators like membranes. This will shape the electric field in a way to reduce the tendency of the ions to follow paths like (a-f).

7. IMPROVING THE SEPARATION BY USING MULTI-STAGE SEPARATION: Due to the practical factors that prevent the realization of complete separation in one step, it is a common practice to repeat the separation steps on the separated isotopes, which is called enrichment. This could be done using different apparatuses, or in the same apparatus. When using different apparatus, the partially separated isotope is removed and processed to convert it into a form suitable for the next reprocessing (like removing the isotope deposits and converting them into metallic sheets or electrolytic feed). Then this separated isotope is reprocessed using a similar apparatus, which could be adjusted to achieve the best results. In the cases where the same apparatus is used for enrichment, the separated ions will continue through electrode (1) to another part of the apparatus to repeat the same process. This could be done by providing slits in the electrode (1), or making it from porous material, to allow the ions to pass through it to the other side. The electrode (1) will act as electrode (2) in the next stage, and another electrode (1) at a suitable voltage difference from now electrode (2) is used, and so on.

FIG. 7 shows a simplified diagram of an isotope separation unit. A roll (5) of the isotopic feed material to be separated is fed using rollers (111), through a slit (10), to the electrolytic tank (9), which is filled very close to the level of the slit (10) with the electrolyte (3). The feed material (5) is electrically connected to a voltage source (positive) to become electrode (2). The collecting electrode (1) is inserted in the tank (9) on the other side opposite to electrode (2). Permanent magnets (12) are placed inside the tank to shape the magnetic field. The apparatus of FIG. 7 could have separators (7) installed, which are not shown to simplify the drawings. It should be noted that the separation apparatus could have any convenient orientation with respect to the earth's surface.

FIG. 8 shows a similar setup like the one shown in FIG. 7 with minor difference. The difference is that the feed material (5) with its feeding mechanism is replaced with the feed electrolyte (4) with its circulating mechanism.

Separation Using Ion Transport Through Electrolytes and Membranes

This method depends on the fact that different masses under the same force will accelerate differently (the smaller mass will accelerate faster). Assume that we have a positive ion of isotope 1, with mass (M1), and electric charge (e), starting at the positive electrode (2), and moving towards the negative electrode (1) in a straight line in the direction (x). The force (F) acting on this ion will be the resultant of the electric force (eE) due to the electric field (E), and other resistances like friction and viscous forces. Assuming constant electric field and constant resistances, the force (F) will be constant, and the distance (x1) that the ion of mass (M1) will reach after time (t), will have the form:

$$x1 = 0.5 * F * t^2 / M1 \quad (10)$$

(By integrating twice the equation F=M1*acceleration). Similarly:

$$x2 = 0.5 * F * t^2 / M2 \quad (11)$$

Subtracting eqn (10) from eqn (11), we get the separation distance (x2−x1), between the two isotopes (M2) and (M1) after traveling for time (t) as:

$$x2 - x1 = 0.5 * F * ((1/M2) - (1/M1)) * t^2 \quad (12)$$

From eqn (11), the time (t) required for M2 to reach the other electrode at a distance (L), is:

$$t^2 = (2 * L * M2) / F \quad (13)$$

From eqn (13) into eqn (12), we get:

$$x2 - x1 = L * [1 - (M2/M1)] \quad (14)$$

Equation (14) shows that the separation distance is a function of the distance (L) and the masses (M1) and (M2) only, and is independent of the force (F). The parameter [1−M2/M1)] of eqn (14), represents the separation dependency on the masses. In the case of U238 with U235 the numerical value of the parameter will be (0.0126), while in the case of Hydrogen H1 with Deuterium D2 it will be (0.5).

The previous analysis was done ignoring other factors, which can work to improve the separation. One of these factors is the frictional and viscous resistance of the electrolyte to the motion of the ions, which can resist further the motion of the heavier isotopes resulting in a better separation. Another factor is the membranes, which can act in many different ways to separate the isotopes. Membranes can increase the time (t), and can have selective characteristics to different isotopes.

FIG. 10 shows a multi-stage isotope separation unit using ion transport through an electrolyte and membranes. It shows an electrolyte tank (9), multiple membranes (6), and the multiple electrodes (1-2). The first electrode on the left side of the tank, in cell (23) is electrode (1) (negative). The last electrode to the right is electrode (2) (positive). The voltage difference between each consecutive electrodes is kept at a value just enough to separate the required isotope. If we assumed that this voltage difference is constant and equals 2 volts, and electrode (1) is at zero volts, then the electrode in cell 22 will be at 2 volts, the electrode in cell 21 will be at 4 volts, and the last electrode to the right (electrode (2)), will be at (2*N) volts (where N is the number of cells). The intermediate electrodes should allow the ions to infiltrate them and could be made from porous graphite or wire mesh. The electrolyte (4) containing the isotopes to be separated is introduced at the right, as shown in FIG. 10. The electric field between the electrode (2) and the next one will ionize the molecules of the isotopes in the electrolyte (4). The negative ions will move towards the positive electrode (2). The positive ions of the isotopes will move to the negative electrode to the left (following the arrow) passing through the membrane (6). Ideally, the lighter the ion, the faster it will transport through the membrane and the electrolyte. The lighter positive ions will reach the electrode (1) faster than the heavier ions. An electrolyte (30) which has no or low concentration of the isotope is introduced into cells (21), (22), and (23) [not shown on the drawings for simplification]. The voltage difference, membrane characteristics, total number of cells (N), and the travel distance from electrode (2) to the first separation cell (21), are chosen to achieve practical separation distances. The widths of the last cells are designed to equate the separation distances between the isotopes. In these last cells the ions will be removed by the flow of the electrolytes (30) to outside the cells. The flow speeds of electrolytes (30) inside these last cells are selected in a way to allow the removal of each isotope once it reaches its separation cell. This will make the electrolyte (30) introduced in cell (21) carry isotope (1) and leaves the cell as electrolyte (31). Similarly, the electrolyte (30) introduced in cell (22) carry isotope (2) and leaves the cell as electrolyte (32), and the electrolyte (30) introduced in cell (23) carry isotope (3) and leaves the cell as electrolyte (33).

It should be noted that the intermediate electrodes (1-2) could be eliminated. Adding them will improve controlling the voltage drop between each two adjacent cells.

It should be noted that I tried to make the drawings represent the general cases, and other embodiments could be generated my eliminating or adding some components. For example, FIG. 9a shows a shaping of the electrode to improve the separation, and FIG. 6 shows a voltage gradient applied to the electrode to improve the separation, both these two methods could be combined together to greatly improve the separation. Also, one of the methods to apply voltage gradient is to build the electrode from separate segments (stripes) and connect each segment to its corresponding voltage. These segments could be shaped and its width could be selected so that each one could collect one isotope.

Thus the scope of the invention should be determined by the appended claims and their legal equivalents, rather than by the examples given.

I claim:

1. An isotopes separation and purification apparatus comprising:
   i. an electrolytic setup means comprising:
      a) a separation container means containing an electrolytic medium means;
      b) an appropriate number of electrodes means disposed at suitable distances from each other in said electrolytic medium means;
      c) a controllable voltage source means that has appropriate number of outputs each is connected to one of the electrodes means;
      d) a means to feed the isotopes to be separated; and
      e) a means to collect the separated isotopes,
   ii. a control means coupled to said controllable voltage source to control it and generate appropriate voltage on each electrode to generate electric fields in said electrolytic medium enough to selectively ionize and apply force on the ions of the selected isotopes, and
   iii. at least one additional separation means acting within the apparatus to improve the separation, whereby the ions of the different isotopes will have a net force on each, different from the other, in the electrolytic is medium due to the effect of all the separation means resulting in excellent separation.

2. The isotopes separation and purification apparatus of claim 1, wherein said additional separation means is a centrifugal force generated by rotating the apparatus around a center line.

3. The isotopes separation and purification apparatus of claim 1, wherein said additional separation means is a membrane inserted between the electrodes.

4. The isotopes separation and purification apparatus of claim 1, wherein said additional separation means is a flow of the electrolytic medium.

5. The isotopes separation and purification apparatus of claim 1, wherein said additional separation means is a magnetic field.

6. The isotopes separation and purification apparatus of claim 1, wherein said additional separation means are a changing magnetic field synchronized with a changing electrical field.

7. The isotopes separation and purification apparatus of claim 1, wherein said additional separation means are additional electrodes inserted at suitable positions and applying to them suitable voltages in a way to improve the separation.

8. The isotopes separation and purification apparatus of claim 1, wherein said means to feed the isotopes is an electrolyte.

9. The isotopes separation and purification apparatus of claim 1, wherein said means to collect the separated isotopes is one of the electrodes.

10. The isotopes separation and purification apparatus of claim 1, wherein said means to collect the separated isotopes is a flow of an electrolytic medium.

11. The isotopes separation and purification apparatus of claim 1, further comprising additional separation and purification stages.

12. A process to separate and purify the isotopes of an element in an electrolytic medium comprising:
   i. providing an electrolytic setup means comprising:
      a) providing a separation container means containing an electrolytic medium means;
      b) providing an appropriate number of electrodes means disposed at suitable distances from each other in said electrolytic medium means;
      c) providing a controllable voltage source means providing appropriate number of outputs each is connected to one of the electrodes means;
      d) providing a means to feed the isotopes to be separated; and
      e) providing a means to collect the separated isotopes,
   ii. providing a control means coupled to said controllable voltage source to control it and generate appropriate voltage on each electrode to generate electric fields in said electrolytic medium enough to selectively ionize and apply force on the ions of the selected isotopes, and
   iii. at least one additional separation means acting within the apparatus to improve the separation, whereby the ions of the different isotopes will have a net force on each, different from the other, in the electrolytic medium due to the effect of all the separation means resulting in excellent separation.

13. The process of claim 12, wherein said additional separation means is providing a centrifugal force.

14. The process of claim 12, wherein said additional separation means are providing a membrane and a centrifugal force.

15. The process of claim 12, wherein said additional separation means is providing an electromagnetic field.

16. The process of claim 12, wherein feeding the element is provided by forming the feed electrode fr the element.

17. The process of claim 12, wherein the feed element is provided as an electrolytic solution to be fed into said container.

18. The process of claim 12, wherein said additional separation means is providing a porous material means.

19. The process of claim 12, wherein said collection means to collect the separated isotopes is a flow of a solution.

20. The process of claim 12, further providing additional separation and purification stages.

* * * * *